3,342,578
BULK-BLENDED FERTILIZER COMPRISING
NITROGENOUS MATRIX PELLET
Albert G. Harshman, Clark, N.J., and Robert L. Stansbury, Littleton, Colo., assignors to Esso Research and Engineering Company, a corporation of Delaware
Filed Jan. 11, 1966, Ser. No. 532,022
6 Claims. (Cl. 71—29)

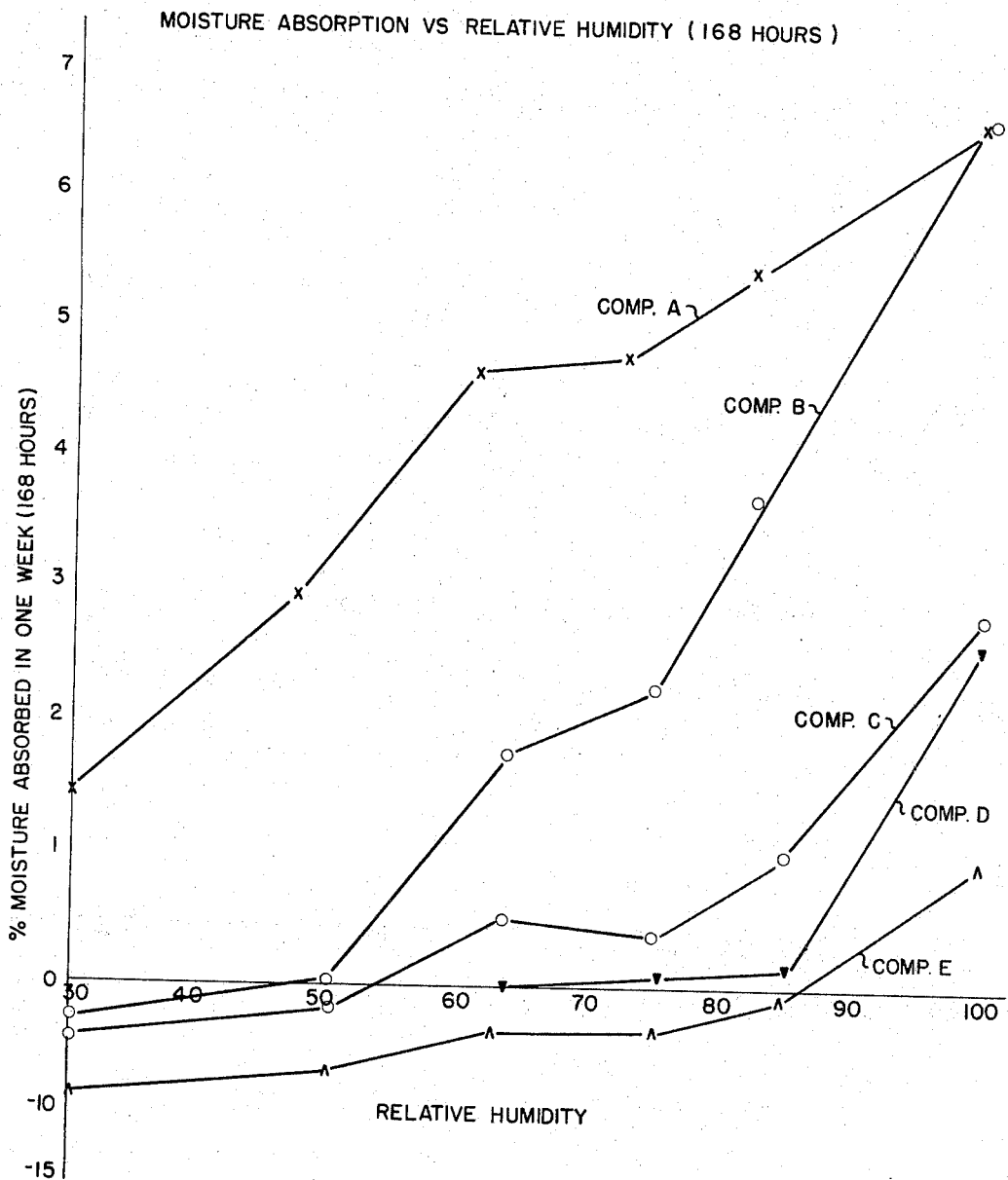

This application is a continuation-in-part of S.N. 249,186 filed Jan. 3, 1963, and now abandoned.

The present invention relates to bulk fertilizer compositions and to an improved method for their manufacture. The invention is more particularly concerned with a new nitrogen source for bulk blending fertilizers. In accordance with a specific adaptation of the invention, nitrogen compounds which are generally not satisfactory for use in bulk blended fertilizers, due to their deliquescent properties, are rendered useful by using a hydrocarbon matrix of the nitrogen compound in combination with a phosphorus and potassium compound.

It is well known in the art that fertilizer compositions generally contain three primary sources of plant nutrition; namely, nitrogen, phosphorus and potassium. A complete fertilizer such as a 3–12–6 (3% nitrogen, 12% $P_2O_5$, and 6% $K_2O$) can be made in two general ways. One is by reacting compounds of nitrogen, phosphorus, and potassium to form materials containing all three elements. In the last several years, a second method, which consists of blending together solid sources of the individual nutrients to the desired analyses, has become very important. This second method is termed bulk blending, and is the subject of this invention.

The most commonly used materials for bulk blending are shown below:

| Nitrogen Source | $P_2O_5$ Source | $K_2O$ Source |
|---|---|---|
| $(NH_4)_2SO_4$, 21% N | Superphosphate, 20% $P_2O_5$ | KCl, 60% $K_2O$ |
| $NH_4NO_3$, 33% N | Triple Superphosphate, 46% $P_2O_5$ | $K_2SO_4$, 50% $K_2O$ |
| $CaCN_2$, 21% N | Dicalcium Phosphate, 38% $P_2O_5$ | |
| Urea, 46% N | | |

It is apparent from the foregoing that by dry blending the foregoing materials with an inert filler, almost any desired fertilizer analysis can be obtained.

With respect to the foregoing, the nitrogen compound which is generally used comprises ammonium sulfate, $(NH_4)_2SO_4$. This compound is desirable even though it is lower in nitrogen content, since other nitrogen compounds, for example, urea and ammonium nitrate, have serious problems of compatibility with other fertilizers.

For example a 20–20–0 fertilizer composition is hygroscopic and will absorb moisture when the relative humidity is above 62.6%. Although this is undesirable, it can be tolerated with accepted fertilizer handling practices. Urea will absorb moisture when the relative humidity is above 72%. Both of these materials when used separately have acceptable physical forms, but when blended together the relative humidity at which these materials will absorb moisture is greatly reduced. This is designated as the critical relative humidity and is illustrated in the following table.

Table I

| Material: | Critical relative humidity 30° C. |
|---|---|
| Urea | 72 |
| 20–20–0 | 62.6 |
| 5% Urea+95% 20–20–0 | 29.8 |
| 15% Urea+85% 20–20–0 | 32.6 |
| 35% Urea+65% 20–20–0 | 37.6 |
| 65% Urea+35% 20–20–0 | 42.1 |
| 75% Urea+25% 20–20–0 | 51.3 |
| 85% Urea+15% 20–20–0 | 59.0 |

This decreased critical relative humidity makes the fertilizer much more hygroscopic and it therefore has unacceptable handling properties. This compatibility problem has prevented urea, and to a great extent $NH_4NO_3$, from being used as nitrogen sources in bulk blending with certain materials.

Thus, certain compounds such as urea and ammonium nitrate, although alright by themselves, when blended formed incompatible deliquescent mixtures. Examples of some other incompatible mixtures are:

(1) Urea-$KNO_3$
(2) Urea-$NaNO_3$
(3) Urea-$Mg(NO_3)_2$
(4) $NH_4NO_3$-$Ca(H_2PO_4)_2$ Thus, in accordance with the present invention, a deliquescent nitrogen compound as, for example, urea or ammonium nitrate, is rendered useful and effective by preventing contact between the deliquescent nitrogen compound and the other components in the fertilizer. Thus, in accordance with the present invention, a fertilizer bulk composition is secured by utilizing the deliquescent nitrogen compound in the form of a matrix pellet.

In particular, the present invention provides an N–P or N–P–K bulk fertilizer, comprising a blend of N–P or N–P–K plant nutrients including a deliquescent nitrogen compound that lowers the critical relative humidity of the blend as compared to the critical relative humidity of the individual components of the blend, said deliquescent nitrogen compound being provided in the form of a matrix pellet consisting of from about 2% to about 25% by weight, based on the matrix pellet, of a thermoplastic material as binder and from about 75% to about 98% by weight, based on the matrix pellet, of said deliquescent nitrogen compound, said deliquescent nitrogen compound being urea, ammonium nitrate, ammonium sulfate, sodium nitrate, potassium nitrate, magnesium nitrate or calcium nitrate, or mixtures thereof.

One suitable method for preparing the matrix pellet utilizes a rotating plate or disc mounted on an inclined axis. Powdered nitrogen compound is placed centrally on the plate and the pellets are rolled up as the powder moves toward the plate's periphery while powder contacts a liquefied or molten thermoplastic binder material.

A preferred method is to extrude pellets from a mixture of nitrogen compound and molten thermoplastic binder. Thus, a suitable matrix pellet may be made by first preparing the deliquescent nitrogen compound in granulated form of appropriate particle size, as is commonly done in the fertilizer industry. These particles preferably should be smaller than about 6-mesh in U.S. sieves, a size below 10-mesh being more desirable, and a grain size passing a 20-mesh sieve being particularly preferred. It is usually desirable also to separate the very fine materials from the granules. The granules, properly screened, are then blended with from about 2 to 25% by weight of a thermoplastic binder. A typical thermoplastic binder composition is a molten hydrocarbon material which has a softening or melting point above at least 120° F. and preferably above about 130° F. Preferably, where a heated binder is used, the granular nitrogen compound is also heated to a temperature at least as high as the melting point of the binder material, after which the latter, desirably at a temperature higher than its melting point, is mixed and blended into the nitrogen compound until the composition is substantially uniform. Instead of heating, binder may be blended with evaporable solvent to facilitate mixing and particle coating. Binders also may be made wholly or in part of thermoplastic resins or plastics such as polyvinyl compounds, polyethylene, polypropylene, petroleum based resins or the like. These may also be either melted or dissolved in suitable evaporable solvents prior to mixing.

A mixture of the types described above, while still plastic, in one preferred method is next extruded through suitable dies to form pellets or small rod-like particles which are compact and solid in structure. The material should contain enough binder to lubricate the dies to some extent, but should be of fairly firm and solid consistency when pelletized. Extruding means are known and form no part of the present invention. Any suitable type may be used, e.g. one wherein the plastic mixture can be forced through orifices or tubular openings of appropriate size and shape. Pellets of 1/16-inch to 1/2-inch or so in diameter are most commonly preferred. The die openings are proportioned in length or taper or otherwise so designed that the frictional forces resisting extrusion will cause the desired degree of compaction to make a strong, firm, pellet. The extruded portions as they emerge from the die are cut off or broken off into short rod-like particles, preferably between about 1/16-inch and 3/4-inch in length. Thereafter, the particles or pellets, if made with molten binder, are cooled promptly to a temperature below the softening or melting point of the binder. When solvent is used, some heat may desirably be applied to expedite pellet drying and hardening. The resulting product is a dense compact particle, of a size that can easily and quite accurately be controlled. It has the desired properties, including a relatively smooth hard surface, and resists rapid water leaching.

A preferred method of preparing the deliquescent nitrogen matrix pellet is to mix the nitrogen compound with a hot molten hydrocarbon composition containing about 90% by weight of asphalt and 10% microcrystalline wax. A particularly preferred binder has a softening point above about 150° F.

A particularly desirable deliquescent nitrogen pellet can be prepared by first forming small pellets, for example, 1/16-inch diameter and 1/8- or 3/16-inch in length, and then mixing these pellets with further amounts of binder, with or without additional unpelleted nitrogen compound to form pellets larger than the first.

Whereas the above description refers to binders and coating materials of asphalt and wax, etc., it will be understood that an asphalt or a wax can be used alone, or mixed in other proportions, or modified by adding other materials such as polyvinyl resins, polystyrene, polymers of ethylene or propylene, or their copolymers, etc. Mixtures of any of these polymers and other plastic materials, including petroleum resins, vinyl resins, other synthetic plastics, and natural materials such as rubber latex, and the like, may be used, with or without asphalt and/or wax. The amount of binder used in either stage of pelleting is preferably between a lower limit of about 2% by weight and preferably not above about 15%, although in specific cases, particularly with smaller pellets, the proportion of binder may go as high as 25% or more.

By manufacturing the fertilizers as described, it is possible to utilize nitrogen compounds having a high nitrogen content such as urea and ammonium nitrate in bulk blends. This is illustrated by the following example.

EXAMPLE

The following fertilizer compositions were prepared.

*Composition A*

25% urea
75% 20-20-0 (20% nitrogen present primarily as ammonium nitrate—20% $P_2O_5$ present as a phosphate)

*Composition B*

Composition A with 10% kaolin added

*Composition C*

Composition A with no urea present

*Composition D*

Urea prills

*Composition E*

Composition A wherein urea is present in bulk composition as a urea matrix pellet consisting of 88% urea and 12% of a blend of 90% asphalt and 10% microcrystalline wax having a melting point about about 150° F.

All compositions were placed in desiccators at controlled humidities for extended periods of time and the moisture absorption measured. The results of these tests are illustrated in Table II and in FIGURE 1.

Table II.—*Moisture absorption vs. time (85% relative humidity)*

| Hours | Treatment | | |
|---|---|---|---|
| | 25% Matrix Urea 75% 20-20-0 | 25% Urea 75% 20-20-0 | 25% Urea [1] 75% 20-20-0 [1] |
| | Percent Moisture Absorbed | | |
| 24 | −0.10 | [2] 1.27 | 0.18 |
| 48 | −0.15 | 2.32 | 0.43 |
| 72 | −0.20 | 3.30 | 1.08 |
| 168 | −0.05 | 5.53 | 3.74 |
| 254 | 1.05 | 8.00 | 6.70 |
| 312 | 1.20 | | |
| 326 | | 12.10 | 9.97 |

[1] Both the urea and the 20-20-0 were individually coated with 10 kaolin clay.
[2] All underlined samples were wet.

It is readily apparent that the matrix urea bulk fertilizer composition gave better storage performance than any other mixture. It is also apparent that conventional coating practices with kaolin clay, while slowing down the moisture absorption at very low relative humidities, did not give satisfactory protection at humidities above 50%. As a result, all of the treatments above 50% relative humidity had become deliquescent.

What is claimed is:
1. An N-P or N-P-K bulk fertilizer, comprising a blend of N-P or N-P-K plant nutrients including a deliquescent nitrogen compound that lowers the critical relative humidity of the blend as compared to the critical relative humidity of the individual components of the blend, said deliquescent nitrogen compound being provided in the form of a matrix pellet consisting of from about 2% to about 25% by weight, based on the matrix pellet, of a thermoplastic material as a binder and from about 75% to about 98% by weight, based on the matrix pellet, of said deliquescent nitrogen compound, said deliquescent nitrogen compound being selected from the group consisting of urea, ammonium nitrate, ammonium sulfate, sodium nitrate, potassium nitrate, magnesium nitrate, calcium nitrate, and mixtures thereof.

2. A bulk fertilizer as defined by claim 1 wherein said deliquescent nitrogen compound is urea.

3. A bulk fertilizer as defined by claim 1 wherein said deliquescent nitrogen compound is ammonium sulfate.

4. A bulk fertilizer as defined by claim 1 wherein said thermoplastic material is selected from the group consisting of asphalt, wax, thermoplastic resins and mixtures thereof.

5. A bulk fertilizer as defined by claim 4 wherein said thermoplastic resin is a polyvinyl resin.

6. An N-P fertilizer composition, comprising about 25% by weight, based on the composition, of a urea matrix pellet and about 75% by weight, based on the composition, of a 20-20-0 fertilizer, said urea matrix pellet consisting of about 88% by weight, based on the pellet, of urea and about 12% by weight, based on the pellet, of a blend of 90% by weight asphalt and 10% by weight microcrystalline wax having a melting point above about 150° F.

References Cited

UNITED STATES PATENTS

| | | | |
|---|---|---|---|
| 2,502,996 | 4/1950 | Rohner | 71—64 |
| 2,936,226 | 5/1960 | Kaufman | 71—1 |
| 3,143,410 | 8/1964 | Smith | 71—64 |
| 3,223,518 | 12/1965 | Hansen | 71—64 |
| 3,232,740 | 2/1966 | Sor et al. | 71—64 |

FOREIGN PATENTS

| | | |
|---|---|---|
| 828,400 | 2/1960 | Great Britain. |

DONALL H. SYLVESTER, *Primary Examiner.*

T. D. KILEY, *Assistant Examiner.*